United States Patent Office 3,052,154
Patented Sept. 4, 1962

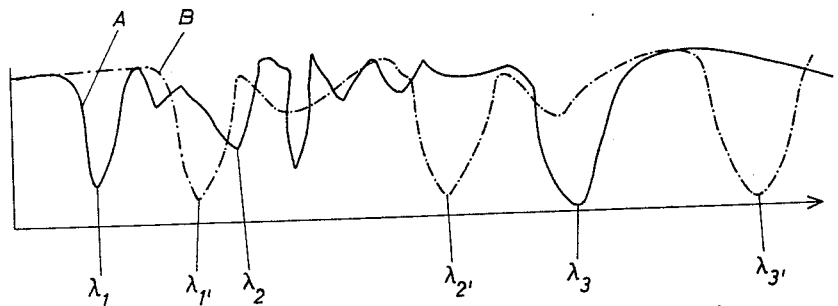
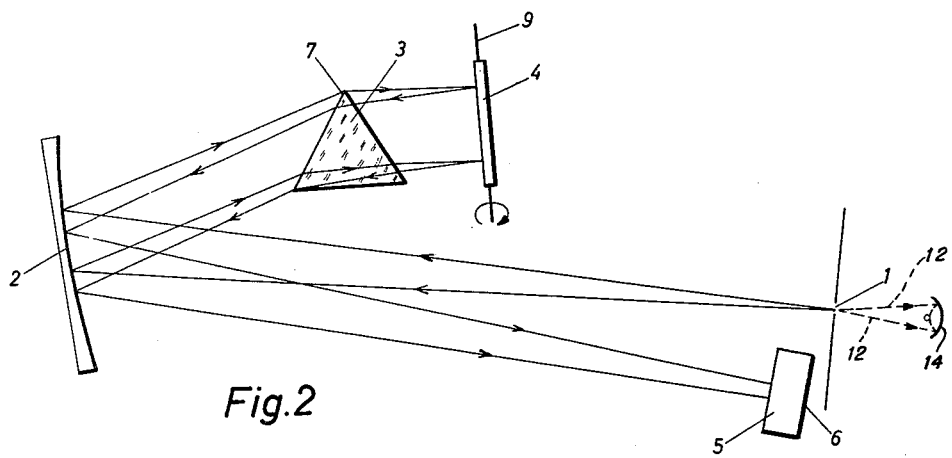
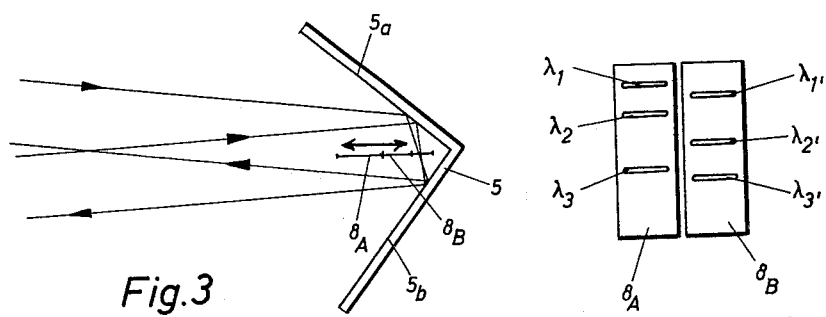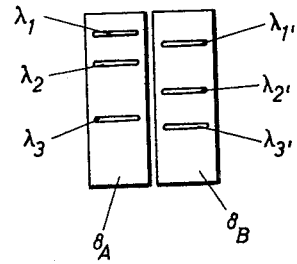

3,052,154
SPECTROSCOPE
Hans Martin Bolz, Uberlingen (Bodensee), Germany, assignor to Bodenseewerk Perkin-Elmer & Co., G.m.b.H., Uberlingen (Bodensee), Germany
Filed Apr. 9, 1959, Ser. No. 805,280
6 Claims. (Cl. 88—14)

This invention relates to a spectroscope in which by means of a slit arrangement selected portions of a spectrum are impinged upon a radiation sensitive detector.

Spectroscopes of the kind referred to above are primarily used to obtain from an absorption spectrum a measured value of a ratio of concentrations. For this purpose, the apparatus is so adjusted that a characteristic absorption band of one component and a characteristic absorption band of another component of a mixture are alternately scanned.

In a well known arrangement of this kind, a spectrum is produced by directing radiation through an entrance slit and a dispersion prism, the spectrum appearing in front of an exit slit. Only a very narrow range of the spectrum is passed by the exit slit behind which a radiation sensitive detector is arranged. A plane parallel glass plate or any other suitable radiation deflecting means projects partly obliquely relative to the optical axis into the ray path. Those rays which penetrate the glass plate produce a spectrum in front of the slit which is displaced by a definite amount with respect to the spectrum produced by the other rays. A chopper disk which alternatingly masks the deflected and the non-deflected partial beam of radiation is rotated in front of the deflecting means or in front of the real image of such means. A portion of the one spectrum and a portion of the other are alternatingly directed to the exit slit and the radiation sensitive detector arranged behind the slit. It is now possible by appropriate adjustment, to achieve spectral ranges dependent on the characteristic absorption bands of the components of the substance undergoing investigation.

It is essential that the two spectral lines passing through the exit slit impinge one after the other in absolutely the same manner upon the same radiation sensitive detector. Differences in detector sensitivity, such as exist between the various zones of a photoelectric cell, for instance, are thus prevented from being effective. With the apparatus of the prior art, however, only two single absorption bands can be compared with each other. This may lead to difficulties if, e.g., a substance also contains other components which absorb in similar spectral ranges.

The invention has for its primary object the provision of apparatus whereby different ranges of a spectrum are alternately caused to impinge in absolutely the same manner upon a radiation sensitive detector. Other objects are to provide apparatus capable of employing different ranges of the spectrum and different absorption bands to make measurements more insensitive to disturbing elements, and to increase the intensity of the radiation utilized and the accuracy of measurement.

According to the invention, a spectrally fan shaped real image of the entrance slit is formed in cyclic succession on a plurality of masks by means of dispersing and focusing means. Each mask is provided with slits for passing only pre-determined portions of the spectrum. The rays passing through the slits are then returned through the system so that they are again centralized to one single exit slit by the dispersing and focusing means.

This arrangement offers the possibility of providing each of the masks with a plurality of slits, the widths and spaced arrangement of which correspond to the width and position of absorption bands in the spectrum of a substance to be investigated.

By means of this invention, several wave lengths may be simultaneously utilized and yet all the radiation passes through a common exit slit. If the dispersing means are formed by a dispersion prism in conjunction with a Littrow mirror, the displacement of the spectrum may be effected either by tilting the Littrow mirror about an axis crosswise to the refracting edge of the prism, or by moving the mask in a horizontal plane longitudinally with respect to the slit shaped recesses. Advantageously the frequency of oscillation of the mirror or of the mask respectively is adapted to the time constant of the radiation detector. The spectrum lies preferably in the central plane of a reflecting square the edge of which is parallel to the dispersion plane. The real image of an entrance slit forming a spectrum is then produced by one of the mirrors of the reflecting square and the rays passing through the slits are reflected by the second mirror parallel to the incident rays.

The operation of a spectroscope of the kind referred to above will be more apparent from the embodiment of the invention contained in the accompanying drawings.

In the drawings:
FIG. 1 shows a graph of absorption as a function of the wave length for two substances A and B,
FIG. 2 illustrates the arrangement of the invention in plan view,
FIG. 3 is the reflecting square (angle mirror) shown in an enlarged scale, and
FIG. 4 represents the masks for the investigation of the aforementioned substances A and B.

Referring to FIG. 1, which shows the absorption coefficient as a function of the wave length for two substances A and B, substance A has typical absorption bands in the infrared range at $\lambda_1$, $\lambda_2$, and $\lambda_3$, while substance B has absorption bands at $\lambda_{1'}$, $\lambda_{2'}$, and $\lambda_{3'}$. In the prior art only one band of each substance has been utilized for measurement, for instance, the bands $\lambda_1$ and $\lambda_{1'}$. In accordance with the invention, however, the intensity of the total radiation at $\lambda_1$, $\lambda_2$, and $\lambda_3$ is compared with the intensity of the total radiation at $\lambda_{1'}$, $\lambda_{2'}$, and $\lambda_{3'}$.

For this purpose, the infrared radiation emitted from a source of radiation (not represented) is directed from a slit 1 to a concave mirror 2, by which parallel orientation of the radiation is effected, and is reflected to a prism 3. A dispersion of the radiation is effected by the prism 3. The dispersed radiation is again reflected by a Littrow mirror 4 to the prism 3, is there further spectroscopically dispersed and hits again the mirror 2. Mirror 2 now produces a real image of the slit 1 which, due to the spectroscopical dispersion, appears in the form of a fan shaped spectrum. Littrow mirror 4 is set at such an angle with respect to the prism that the spectrum produced extends beyond at least the wavelengths of $\lambda_1$ at one end and $\lambda_{3'}$ at the other. This spectrum is now tilted into a horizontal plane (FIG. 3) by the upper mirror 5a of a reflecting square (angle mirror) 5 the edge 6 of which is arranged crosswise to the refracting edge of the prism 3. The arrangement of the elements and components of the optical system has been so conceived and constructed that the spectrum lies in the central plane of the reflecting square. Masks $8_A$ and $8_B$ are arranged, as shown in FIG. 4, in this plane, and are provided with slits corresponding exactly to the position of the absorption bands $\lambda_1$, $\lambda_2$, $\lambda_3$, or $\lambda_{1'}$, $\lambda_{2'}$, $\lambda_{3'}$, respectively, in the spectrum. The masks $8_A$, $8_B$ are exchangeable and may be replaced by masks with other slit arrangements.

The radiation passing through the slits is now reflected by the lower part 5b of the reflecting square 5 in parallel with the arriving radiation from mirror 2 but in a different plane and passes through the entire optical system of the apparatus in reverse. Consequently, the dispersed radiation is again united by the prism 3 and through the mirror 2 focused on an exit slit arranged close to the entrance slit 1. In the illustrated embodiment of FIG. 2, the returning radiation will lie exactly below the radiation shown. The lower half of entrance slit 1 may be the exit slit. It will also be apparent that a separate exit slit could be placed immediately below slit 1. The radiation 12 leaving the exit slit is measured by detector 14.

The Littrow mirror swings about an axis 9 that is arranged crosswise with respect to the refracting edge 7 of the prism 3.

The operation of the arrangement described is as follows:

As the mirror 4 swings about the axis 9, the spectrum moves to and fro in cyclic succession between the masks $8_A$ and $8_B$. The radiation passing through each set of slits is combined, concentrated on the exit slit, and impinged upon a radiation sensitive detector which may be a thermocouple, for instance. The detector receives alternately only the wave lengths $\lambda_1$, $\lambda_2$, and $\lambda_3$ or only $\lambda_{1'}$, $\lambda_{2'}$, and $\lambda_{3'}$. The ratio of the intensities of this radiation may be obtained through the output signal of the radiation sensitive detector. This signal provides a measure of the ratio of concentrations. The intensities are greater than those of the prior art and are composed of the radiation of various wave lengths, so that disturbances that might interfere are of less importance. If the mask is moved, rather than the Littrow mirror, the operation of the system will be the same.

It is, of course, possible to use a diffraction grating rather than a prism. Other suitable parts may be oscillated instead of the Littrow mirror, for example the angle mirror. As will be readily appreciated, the invention may also be employed for the separation and consolidation of groups of emission lines. Various other modifications may be made in the apparatus of this invention without departing from the spirit thereof.

I claim:

1. Apparatus for the measurement of selected radiation wavelengths which comprises radiation entrance slit means; optical means positioned to receive the radiation from said slit means and transmit said radiation in collimated form; dispersion means positioned to receive said collimated radiation and selectively alter the direction of the component wavelengths thereof; reflector means positioned to receive the radiation and return it to said dispersion means and said optical means, said optical means being adapted to receive and focus said radiation to form a spectrally dispersed first image of said slit means; a roof mirror positioned adjacent the focal point of said optical means to receive converging radiation on one plane reflector and reflect diverging radiation with the other plane reflector, said roof mirror being positioned with the line of intersection of its plane surfaces perpendicular to the longitudinal dimension of the slit image and in the plane of said first image; a first mask having a plurality of slit means selectively positionable in the plane of said first image to pass some wavelengths and block other wavelengths; a second mask having a plurality of slit means positionable in the focal plane of said first image to pass some wavelengths and block other wavelengths; means for positioning said first image selectively on each of said first and second masks in said focal plane; means for recombining the radiation transmitted by said masks to form a second image of said entrance slit; and exit slit means positioned at said second image.

2. Apparatus for the measurement of selected radiation wavelengths which comprises radiation entrance slit means; optical means positioned to receive the radiation from said slit means and transmit said radiation in collimated form; dispersion means positioned to receive said collimated radiation and selectively alter the direction of the component wavelengths thereof; rotatable plane reflector means positioned to receive the dispersed radiation and arranged to rotate about an axis transverse to the longitudinal axis of said slit means; said optical means adapted to receive the dispersed, reflected radiation and selectively focus the component wavelengths thereof; a plurality of first slit means and a plurality of second slit means positioned at approximately the focal distance from said optical means to selectively pass some wavelengths while blocking others, said first slit means being positioned to receive said radiation when said rotatable reflector means is in one position and said second slit means being positioned to receive said radiation when said rotatable reflector means is in another position; said optical means positioned to receive and collimate the selected radiation wavelengths; said dispersion means positioned to receive the collimated beams and selectively alter the directions thereof to produce a unitary collimated radiant energy beam of recombined selected wavelengths; means for measuring the radiation intensity of said unitary radiant energy beam; and means for rotating said rotatable reflector means.

3. Apparatus for the measurement of selected radiation wavelengths which comprises radiation entrance slit means; optical means positioned to receive the radiation from said slit means and transmit said radiation in collimated form; dispersion means positioned to receive said collimated radiation and selectively alter the direction of the component wavelengths thereof; said optical means adapted to receive the dispersed reflected radiation and selectively focus the component wavelengths thereof; a plurality of first slit means and a plurality of second slit means positioned at approximately the focal distance from said optical means to selectively pass some wavelengths while blocking others when said first and second slit means are selectively alternately positioned in said radiation; said optical means positioned to receive and collimate the selected radiation wavelengths; said dispersion means positioned to receive the collimated beams and selectively alter the directions thereof to produce a unitary collimated radiant energy beam of recombined selected wavelengths; means for measuring the radiation intensity of said unitary radiant energy beam; and means for selectively alternately said first and second slit means in said radiation.

4. The apparatus of claim 1 wherein said dispersion means is a prism.

5. The apparatus of claim 4 wherein said optical means is a paraboloidal reflector.

6. Radiation filtering apparatus which comprises radiation entrance slit means; dispersion means positioned to form a spectrally dispersed first image of said slit means; first and second mask means positionable in the plane of said image, each of said mask means being adapted to transmit portions of said spectrally dispersed image but being substantially opaque to other portions; means for providing alternating relative movement between said first image and each of said first and second mask means; means for recombining the radiation transmitted by each of said masks to form a second image of said entrance slit; and exit slit means positioned at said second image.

References Cited in the file of this patent

UNITED STATES PATENTS

| | | |
|---|---|---|
| 1,727,173 | Muller | Sept. 3, 1929 |
| 2,652,742 | Walsh | Sept. 22, 1953 |
| 2,743,646 | Strong | May 1, 1956 |